United States Patent
Yunker et al.

(10) Patent No.: US 6,854,894 B1
(45) Date of Patent: Feb. 15, 2005

(54) OPTICAL RECEPTACLE, TRANSCEIVER AND CAGE

(76) Inventors: Bryan Yunker, 1194 Twin Peaks Cir., Longmont, CO (US) 80503-2170; Andrew Kayner, 919 Lincoln Pl., Boulder, CO (US) 80302

( * ) Notice: Subject to any disclaimer, the term of this patent is extended or adjusted under 35 U.S.C. 154(b) by 0 days.

(21) Appl. No.: 09/941,832

(22) Filed: Aug. 30, 2001

(51) Int. Cl.[7] .................................................. G02B 6/36
(52) U.S. Cl. ........................................................ 385/53
(58) Field of Search ............................... 385/88–89, 92, 385/53; 359/152, 195, 175, 188, 173

(56) References Cited

U.S. PATENT DOCUMENTS

| | | | |
|---|---|---|---|
| 5,293,581 A | * | 3/1994 | DiMarco .................... 385/76 |
| 5,532,428 A | | 7/1996 | Radloff et al. ............... 174/35 |
| 5,613,025 A | * | 3/1997 | Grois et al. .................. 385/53 |
| 5,691,504 A | | 11/1997 | Sands et al. ................. 174/35 |
| 5,767,999 A | | 6/1998 | Kayner ....................... 359/163 |
| 6,011,691 A | | 1/2000 | Schreffler .................... 361/704 |
| 6,027,252 A | * | 2/2000 | Erdman et al. ............... 385/76 |
| 6,044,540 A | | 4/2000 | Fontana ....................... 29/505 |
| 6,047,172 A | | 4/2000 | Babineau et al. ........... 455/350 |
| 6,181,571 B1 | | 1/2001 | Sugimoto .................... 361/799 |
| 6,185,109 B1 | | 2/2001 | Koradia et al. ............. 361/818 |
| 6,267,606 B1 | * | 7/2001 | Poplawski et al. ............ 439/92 |
| 6,412,986 B1 | * | 7/2002 | Ngo et al. .................... 385/53 |
| 6,478,472 B1 | * | 11/2002 | Anderson et al. ............. 385/53 |

* cited by examiner

Primary Examiner—Javaid H. Nasri

(57) ABSTRACT

The present invention provides multi-optoelectronic assemblies in which a plurality of multi-receiver cages in which are mounted multi-optical receptacle assemblies associated with a plurality of transceivers are mounted on a printed wire assembly. The multi-optical receptacle assemblies includes a plurality of receptacles having shared walls, unitary walls or no walls. The multi-optoelectronic assemblies are compatible with multi-fiber assemblies.

17 Claims, 11 Drawing Sheets

702

OPTICAL RECEPTACLE, TRANSCEIVER AND CAGE

CROSS-REFERENCE TO RELATED APPLICATIONS

This application makes reference to the following co-pending U.S. Patent Applications. The first application is U.S. application Ser. No. 09/281,982, entitled "Fiber optic Ferrule," filed Mar. 31, 1999. The second application is U.S. application Ser. No. 09/389,220, entitled "Enclosure for optical Subassembly Having Mechanical Alignment Features," filed Sep. 3, 1999. The third application is U.S. application Ser. No. 09/635,102, entitled "Pluggable Small Form Factor Transceivers," filed Aug. 9, 2000. The entire contents and disclosures of the above-listed applications are hereby incorporated by reference.

BACKGROUND OF THE INVENTION

1. Field of the Invention

The present invention relates generally to optical receptacles transceiver housings, transceiver cages and transceiver mountings.

2. Description of the Prior Art

Existing optical transceivers may be mounted on a standard printed wire assembly (PWA) to provide a maximum of 20 ports in the width of standard 19-inch equipment. If double-sided mounting of the transceiver is done on a PWA then the number of ports may be increased to 40. There has been a need to increase the port density on a standard PWA further in order to keep up with increasing system bandwidth and interconnection density needs. However, existing LC Small Form Factor (SFF) or Small Form Factor Pluggable (SFP) transceivers are not able to be mounted on a standard PWA to provide additional ports without turning the PWA vertically to gain length.

Thus there is a need for a way to increase the linear port density to more than 20 ports on one side and more than 40 ports on two sides of a standard PWA.

SUMMARY OF THE INVENTION

It is therefore an object of the present invention to provide an electronic or optoelectronic device that allows more than 20 ports to be mounted on one side of a PWA.

It is therefore an object of the present invention to provide an electronic or optoelectronic device that allows more than 40 ports to be mounted on two sides of a PWA.

According to a first broad aspect of the present invention there is provided a multi-optical receptacle assembly comprising at least two optical receptacles for at least two respective transceivers, said at least two optical receptacles having a shared wall between adjacent optical receptacles of said at least two optical receptacles.

According to a second broad aspect of the present invention there is provided a multi-transceiver assembly comprising at least two transceivers having a shared wall between adjacent transceivers of said at least two transceivers.

According to a third broad aspect of the present invention there is provided a multi-transceiver cage comprising a hollow cage body for mounting at least two transceivers within said multi-transceiver cage and for preventing electromagnetic radiation from outside said cage body from entering said cage body and for preventing radiation from said transceiver from exiting said cage body; a plurality of mounting pins extending from said cage body for mounting said transceiver on a printed wiring board; and a plurality of internal contact fingers at a proximal open end of said hollow cage body for engaging a chassis panel through which said transceiver cage is inserted and for engaging said at least two transceivers.

According to a fourth broad aspect of the present invention there is provided an optoelectronic device comprising at least two transceivers; and a transceiver cage comprising a hollow cage body for mounting said least two transceivers within said multi-transceiver cage and for preventing radiation from outside said cage body from entering said cage body and for preventing radiation from said transceiver from exiting said cage body; a plurality of mounting pins extending from said cage body for mounting said transceiver on a printed wiring board; and a plurality of internal contact fingers at a proximal open end of said hollow cage body for engaging a chassis panel through which said transceiver cage is inserted and for engaging said at least two transceivers.

According to a fifth broad aspect of the present invention there is provided a multi-optical receptacle assembly comprising at least two optical receptacles for at least two transceivers; a connecting means that connect together said at least two optical receptacles; and a mounting means for mounting said multiple-optical receptacle assembly in a transceiver housing.

According to a sixth broad aspect of the present invention there is provided a multi-transceiver housing comprising an opening at a proximal end thereof for receiving at least two optical receptacles for at least two respective transceivers; and means for mounting said at least two optical receptacles in said multi-transceiver housing.

According to a seventh broad aspect of the present invention there is provided an optoelectronic device assembly comprising a PWA; and at least one optoelectronic device mounted on at least one side of said PWA, wherein said at least one optoelectronic device comprises at least two transceivers; and a transceiver cage comprising a hollow cage body for mounting said least two transceivers within said multi-transceiver cage and for preventing radiation from outside said cage body from entering said cage body and for preventing radiation from said transceiver from exiting said cage body; a plurality of mounting pins extending from said cage body for mounting said transceiver on a printed wiring board; and a plurality of internal contact fingers at a proximal open end of said hollow cage body for engaging a chassis panel through which said transceiver cage is inserted and for engaging said at least two transceivers.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "port" refers to an electrical or optical interface that may be used in a transmitter or receiver for transmitting or receiving information.

For the purposes of the present invention, the term "transceiver" refers to an electrical or optical transmitter, an electrical or optical receiver, or an electrical or optical transceiver. Unless otherwise specified, a "transceiver" refers to an optical transceiver comprising two ports, one port comprising a transmit port and one port comprising a receive port.

For the purposes of the present invention, the term "proximal" refers to the end of a transceiver housing or transceiver cage in which a optical receptacle is mounted.

For the purposes of the present invention, the term "distal" refers to the end of a transceiver housing or transceiver cage of the present invention opposite to the proximal end.

For purposes of the present invention, the term "transverse" refers to a direction extending from the proximal end to the distal end or the distal end to the proximal end of an optical receptacle, transceiver housing, or transceiver cage of the present invention. For example, the shared walls shown in the embodiments of the present invention illustrated in FIGS. 4, 5, 6A–6E, 7A–7E extend in a transverse direction.

For the purpose of the present invention, the term "longitudinal" refers to a direction perpendicular the transverse direction. For example, the optical receptacles shown in the embodiments of the present invention illustrated in FIGS. 4, 5, 6A–6E, 7A–7E are arranged in a longitudinal direction with respect to each other.

For the purposes of the present invention, the terms "left" and "right" refer to the left and right sides of a transceiver housing or transceiver cage as viewed from the proximal end of the transceiver housing or transceiver cage.

Figure 4:
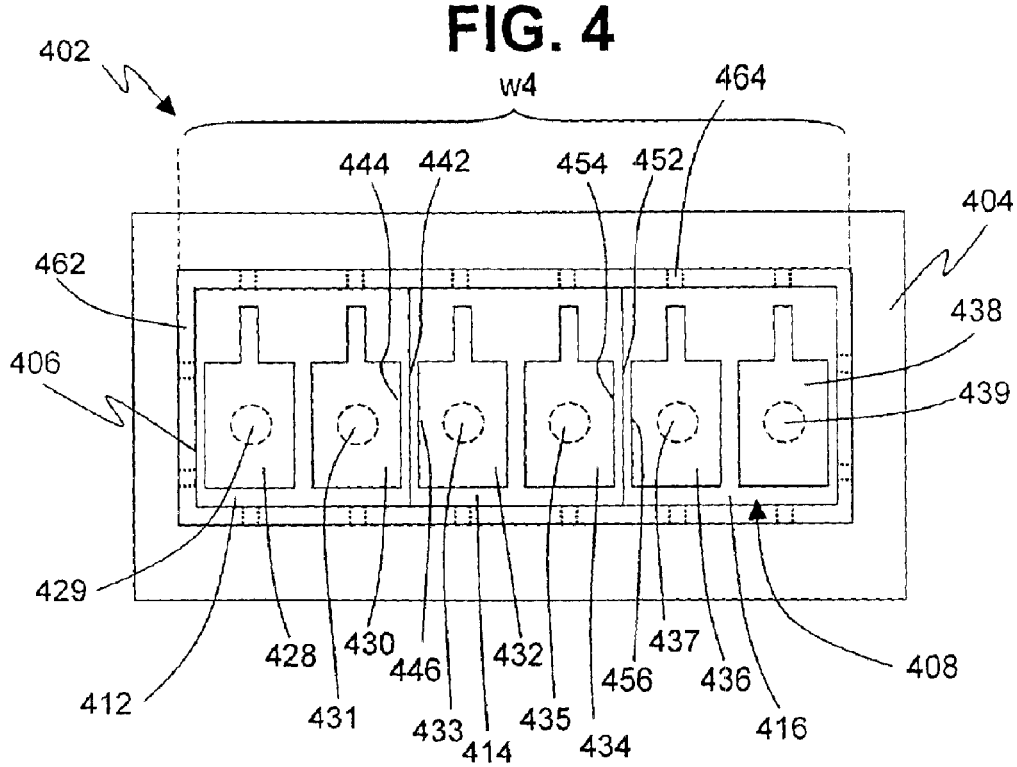
FIG. 4 illustrates in simplified form a multi-transceiver assembly of the present invention mounted in a chassis panel.

For the purposes of the present invention, the term "shared wall" refers to a wall shared by two devices such as a two optical receptacles, two transceiver, etc. A shared wall may be "two-part", such as each of the twopart shared walls shown in FIG. 4 in which the "shared wall" shared by two adjacent optical receptacles and consists of adjacent wall of the two adjacent optical receptacles of a multi-piece multi-optical receptacle assembly. A "two-part" shared wall may be an "abutting" shared wall as shown in FIG. 4 or "separated" as shown in FIGS. 7B, 7C, 7D, and 7E. The shared wall may also be "unitary", such as the shared walls in shown in FIG. 5, in which the "shared wall" is one piece and is part of a unibody multi-optical receptacle assembly.

For the purposes of the present invention, the term "unibody construction" refers to a device such as an optical receptacle, transceiver housing, transceiver cage that is made from a single piece of material.

For the purposes of the present invention, the term "integrally formed" refers to any feature such as tabs, pins, supports, clips, dimples, etc. that are part of a unibody construction.

For the purposes of the present invention, the term "contact fingers" refers to two or more features meant for making electrical contact between a transceiver housing and a optical receptacle or between a transceiver cage and a chassis panel such that relative movement between any 2 contact fingers is sufficient to allow electrical contact by both fingers in the presence of mechanical misalignment which would otherwise prevent both contact fingers from achieving electrical contact.

For the purposes of the present invention, the term "MSA" Multi Source Agreement refers to an agreement between two or more device suppliers who have defined the mechanical and electrical specifications of a device form factor and application.

For the purposes of the present invention, the term "SFF" or Small Form Factor refers to a device comprising two ports, is approximately one-half inch wide, which typically uses an "LC" style optical receptacle, and which is typically soldered down to a PWA. SFF characteristics are exemplified by an SFF MSA.

For the purposes of the present invention, the term "SFP" or Small Form Factor Pluggable refers to a device that comprising two ports, is approximately one-half inch wide, and which may repeatedly be mated and de-mated to a PWA by insertion and removal from a cage through a chassis pannel. SFP characteristics are exemplified by an SFP MSA.

For the purposes of the present invention, the term "chassis panel" refers to a panel including openings behind which one or more transceivers are mounted and through which the transceivers extend.

For the purposes of the present invention, the term "optical receptacle" refers to a device comprising at least two ports. In the case of two ports, one port may be for a receiving a signal and another port for transmitting a signal, both ports may be for transmitting signals, or both ports may be for receiving signals. An optical receptacle may have a separate body or may consist of two ports of a multi-optical receptacle assembly. For convenience, unless specified otherwise specified, each pair of ports in a multi-optical receptacle assembly of the present invention may be viewed as comprising an optical receptacle.

For the purposes of the present invention, the term "side wall" with respect to a transceiver, a multi-transceiver assembly, a multi-transceiver housing, a cage, a multi-transceiver cage, etc. refers to any wall of transceiver, multi-transceiver or cage that is parallel to the walls shared by adjacent ports of a receptacle or multi-receptacle assembly mounted in the transceiver, a multi-transceiver assembly, a multi-transceiver housing, a cage, a multi-transceiver cage, etc.

For the purposes of the present invention, the term "sidestack" refers to the arrangement of devices such as optical receptacles, transceivers, transceiver cages, etc. in a series where devices are stacked side by side with their side walls adjacent to each other.

For the purposes of the present invention, the term "main body wall" refers to the two parallel walls that connect the side walls of transceiver, a multi-transceiver assembly, a multi-transceiver housing, a cage, a multi-transceiver cage, etc.

For the purposes of the present invention, the term "collective width" refers to the aggregate width of a series of devices such as transceivers, cages, optical receptacles, etc. whether those devices are individual devices or part of an assembly of devices.

For the purposes of the present invention, the term "highest signal frequency" refers to the fundamental frequency of the signal corresponding to an alternating 1's and 0's pattern at the highest baud rate. This is generally ½ the baud rate, expressed in Hz. For example, in a 10 Gigabaud transceiver, the highest signal frequency would generally be 5 Gigahertz.

DESCRIPTION

A standard printed wire assembly (PWA) for 19-inch wide rack mounted equipment for example, has a useful width of approximately 15". Up to 23 conventional SFF or SFP optical transceivers may practically be mounted on one side of such a PWA to provide 46 ports on one side of the PWA. If double-sided mounting is employed, up to 46 transceivers may be mounted on the PWA thereby providing up to 92 ports. A linear density higher than 23 transceivers per side of a PWA for this example cannot be achieved using a standard SFF or SFP transceiver.

A standard LC SFF transceiver occupies 0.55" space on a side of the PWA and when conventional transceivers are mounted on a PWA, the transceivers are separated by portions of the chassis panel in which the transceivers are mounted. These portions of the chassis panel are used to minimize the electromagnetic interference (EMI) aperture of each transceiver and to facilitate mechanical mounting of multiple transceivers. In practice, 0.1" of space between transceivers is required, and a pitch of 0.65" per LC SFF is used. Therefore, a standard PWA has the capacity to accommodate a maximum of 15"/0.65"=23.08 conventional transceivers. Therefore, such a PWA has space for a maximum of 23 transceivers single-sided or 46 transceivers with conventional SFF optical transceivers mounted double-sided on a PWA. Other PWAs are 13.5" wide, allowing each side to contain a maximum of 20 SFF or SFP transceivers, or 40 ports. A standard LC optical receptacle has two ports, separated by 0.246 inch.

If the transceiver ports could be located more closely to each other, a higher linear port density would be possible. If the spaces between the transceivers could be eliminated, then in 15" of PWA, the maximum number of LC SFF transceivers that may be mounted is 15"/0.55"=27.3 units. Therefore, 27 transceivers could be mounted on each side of a PWA, if the transceivers could be mounted close enough together. With double-side mounting, up to 54 transceivers could be mounted on a 15" PWA.

In one preferred embodiment, the present invention provides an optoelectronic device that reduces or completely eliminates the need for the portions of the chassis panel between each adjacent transceiver/optical receptacle, thereby allowing 24 ports to be mounted single-sided or 48 ports to be mounted double-sided on a standard PWA.

Figure 1:
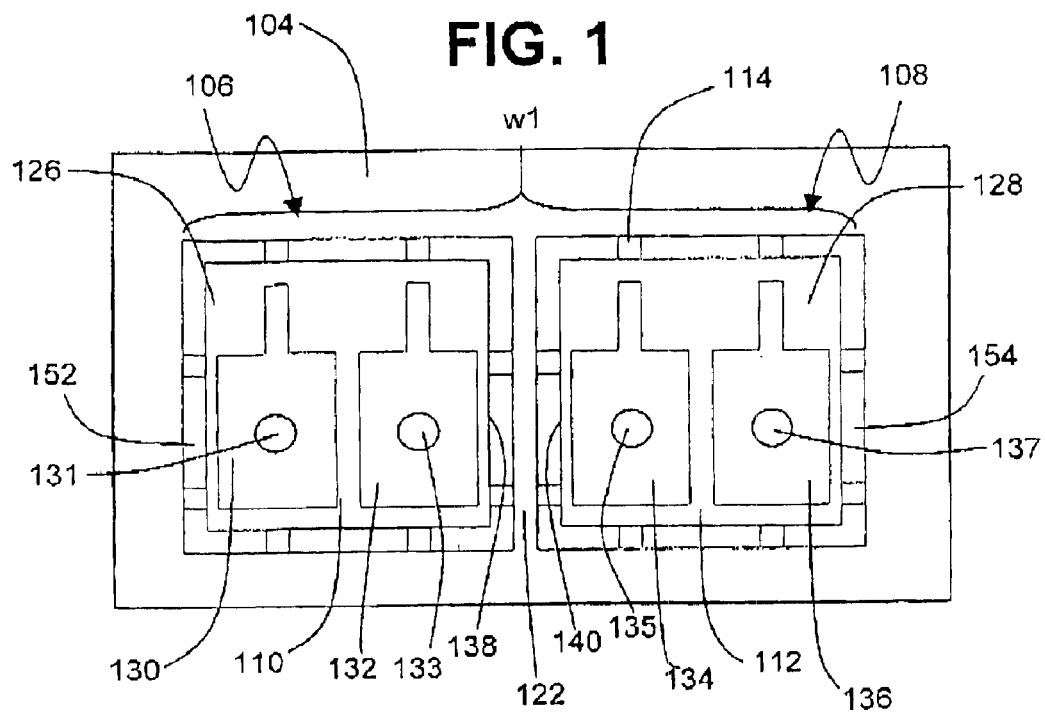
FIG. 1 illustrates in simplified form SFF MSA transceivers mounted in a chassis panel.

FIG. 1, illustrates in simplified form a conventional SFF assembly 102 as exemplified by the SFF MSA. Assembly 102 is mounted in a chassis panel 104. Transceivers 106 and 108 are arranged side by side in assembly 102. Transceivers 106 and 108 are encased in transceiver housings 110 and 112, respectively, that reduce the electromagnetic interference (EMI) between transceivers 106 and 108, system components and the system exterior. Transceiver housings 110 and 112 include EMI contacts 114 that contact chassis panel 104 to thereby minimize EMI leakage from the interior of the system to outside the chassis. An EMI aperture control section 122 of chassis panel 104 between transceivers 106 and 108 also reduces EMI emission from the system interior in a proximal direction beyond chassis panel 102 into the external environment (not shown) by creating smaller apertures in the panel. Mounted in transceivers 104 and 106 are LC optical receptacles 126 and 128, respectively. Optical receptacles 126 and 128 each include two ports 130, 132 and 134, 136, respectively. Each port 130, 132, 134 and 136 includes a fiber ferrule 131, 133, 135 and 137, respectively. Optical receptacles 126 and 128 also include walls 138 and 140, respectively that are separated by the aperture control section 122 and transceiver housings 110 and 112. Assembly 102 has a collective width w1 that extends from outer wall of transceiver chassis opening 152 to outer wall of transceiver chassis opening 154.

Figure 2:
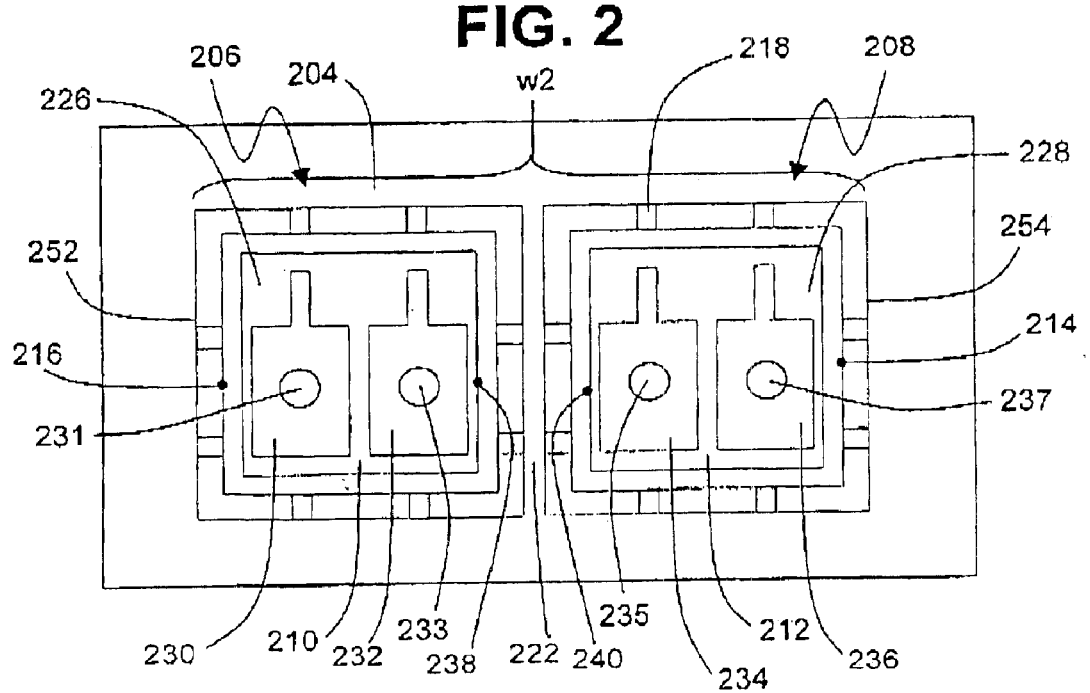
FIG. 2 illustrates in simplified form SFP MSA transceivers mounted in a chassis panel.

FIG. 2 illustrates in simplified form a conventional SFP assembly 202. Assembly 202 is mounted in a chassis panel 204. Transceivers 206 and 208 are arranged side by side in assembly 202. Transceivers 206 and 208 are encased in transceiver housings 210 and 212, mounted in transceiver cages 214 and 216, respectively, that reduce the electromagnetic interference (EMI) between transceivers 206 and 208, interior system components and the system exterior. Transceiver cages 214 and 216 include EMI contacts 218 that contact chassis panel 204 to thereby minimize EMI leakage from the interior of the system to outside the chassis. An EMI aperture control section 222 of chassis panel 204 between transceiver cages 214 and 216 reduces EMI emission from transceivers 204 and 206 in a proximal direction beyond chassis panel 202 into the external environment (not shown) by creating smaller apertures in the panel. Mounted in transceivers 206 and 208 are LC optical receptacles 226 and 228, respectively. Optical receptacles 226 and 228 each include two ports 230, 232 and 234, 236, respectively. Each port 230, 232, 234 and 236 includes a fiber ferrule 231, 233, 235 and 237, respectively. Optical receptacles 226 and 228 also include walls 238 and 240, respectively that are separated by aperture control section 222 and transceiver cages 214 and 216. Assembly 202 has a collective width w2 that extends from outer wall of transceiver cage opening 252 to outer wall of transceiver cage opening 254.

Figure 3:
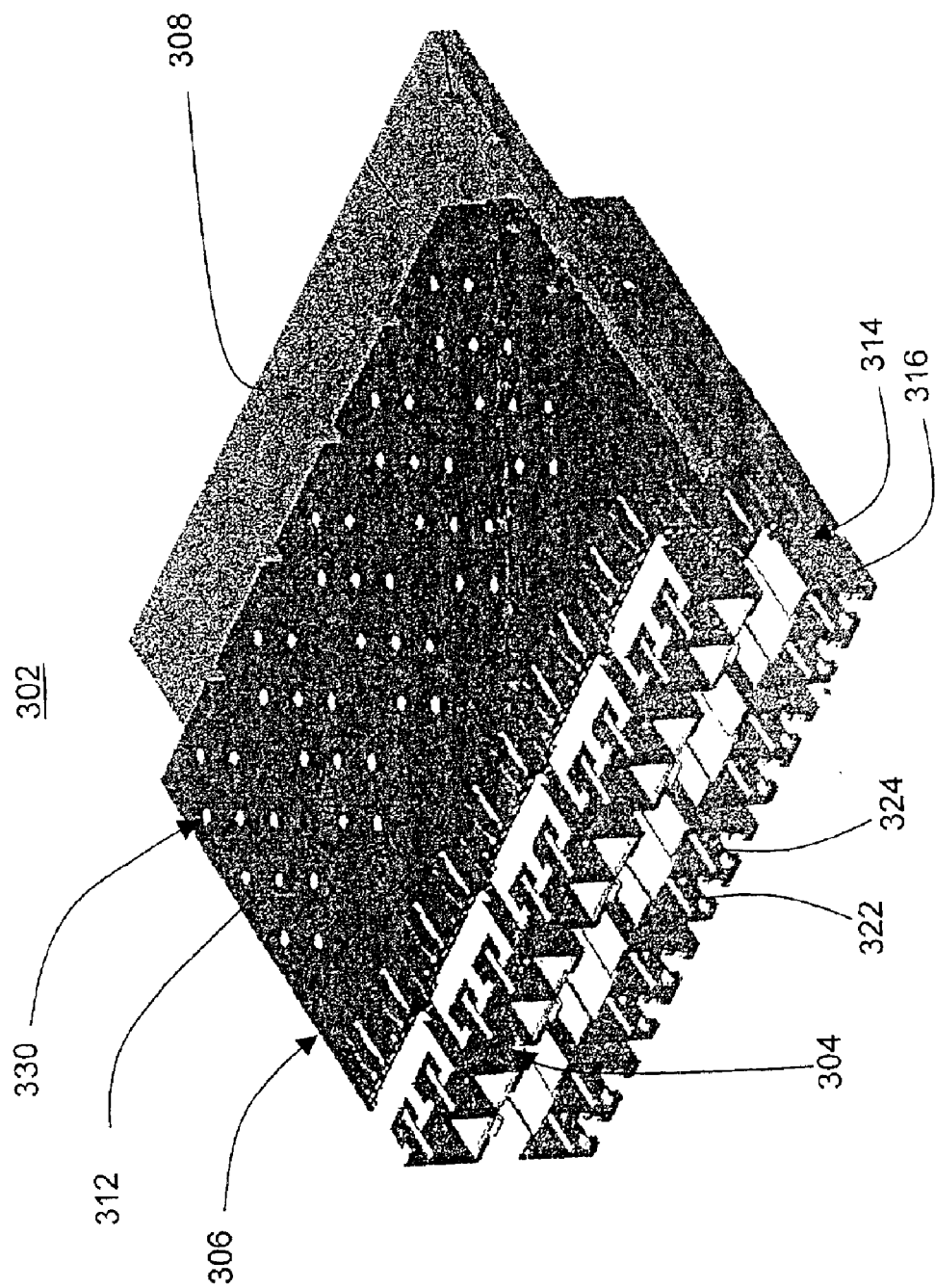
FIG. 3 is a top perspective view of an optoelectronic device assembly using cages for single SFP transceivers.

An optoelectronic device assembly 302 including gaps 304 between each pair of adjacent optoelectronic devices 306 is illustrated in FIG. 3. Optoelectronic devices 306 are mounted on both sides of a PWA 308. Each optoelectronic device includes a cage 312 in which is mounted an optical transceiver 314 including an optical receptacle 316 that protrudes from cage 312. Each optical receptacle 316 includes a transmit port 322 for transmitting a signal and a receive port 324 for receiving a signal. It is also possible for any of the optical receptacles to include two transmit ports or two receive ports. Each cage 312 includes legs (not shown) that extend through openings (not shown) in PWA 308 and allow optoelectronic devices 306 to be mounted on PWA 308. Each cage 312 also includes radiation control openings 330.

Each radiation control opening of the cages shown in the embodiment of FIG. 3 preferably has a diameter no more than ¼ of the wavelength of the electromagnetic radiation corresponding to ten times the highest signal frequency present in transceiver circuitry connected to the transceiver cage.

The cages, transceivers and optical receptacles shown in FIG. 3 are similar to the cages, transceivers and optical receptacles described in U.S. application. Ser. No. 09/635, 102, now U.S. Pat. No. 6,780,053 entitled "Pluggable Small Norm Factor Transceivers," filed Aug. 9, 2000, the entire contents and disclosure of which is hereby incorporated by reference. The gaps between adjacent optoelectronic devices in the configuration shown in FIG. 3 limit the number of transceivers that may be mounted on each side of the PWA. The optoelectronic device assembly of FIG. 3 may be mounted in a chassis similarly to how the assembly of FIG. 2 is mounted in a chassis, with portions of the chassis filling the gaps between adjacent optoelectronic devices and cages to prevent EMI emission from the chassis.

FIG. 4, illustrates a multi-transceiver assembly 402 of the present invention mounted in a chassis panel 404. Multi-transceiver assembly 402 has a width w4 and includes a multi-transceiver housing 406 in which is mounted a multi-piece multi-optical receptacle assembly 408. Multi-optical receptacle assembly 408 includes three adjacent optical receptacles 412, 414 and 416. Each of optical receptacles 412, 414 and 416 is part of one of the three transceivers (not shown) contained in multi-transceiver housing 406. Optical receptacle 412 includes two ports 428 and 430 for transmitting and/or receiving signals; optical receptacle 414 includes a two ports 432 and 434 for transmitting and/or receiving signals; and optical receptacle 416 includes two ports 436 and 438 for transmitting and/or receiving signals. Each port 428, 430, 432, 434, 436 and 438 includes an optional fiber ferrule 429, 431, 433, 435, 437 and 439, respectively. Optical receptacles 412 and 414 have a two-part abutting shared wall 442 consisting of wall 444 of optical receptacle 412 and wall 446 of optical receptacle 414. Optical receptacles 414 and 416 have a two-part shared wall 452 consisting of wall 454 of optical receptacle 414 and wall 456 of optical receptacle 416. Multi-transceiver assembly 402 has a width w4 which spans that of multi-transceiver chassis opening 462. Optional EMI contacts 464 contact chassis panel 404 to minimize EMI leakage from the interior of the system to outside the chassis.

As can be seen in FIG. 4, through the use of shared optical receptacle walls, the multi-transceiver assembly of has a collective width that is considerably less than three conventional transceivers would have when mounted in a chassis panel. Although only three optical receptacles are shown mounted in the multi-transceiver assembly of FIG. 4, the present invention envisions multi-transceiver assemblies for any number of transceivers with associated optical receptacles mounted therein. In the case of a multi-piece multiple optical receptacle assembly of the type shown in FIG. 4, the optical receptacles may be held in place relative to each other by interior structures within the multi-transceiver assembly or the individual optical receptacles may be attached to each other to form a single block of optical receptacles. The optical receptacles may be attached to each other by an adhesive, by snap fitting, by ultrasonic welding, or by any other means.

Figure 5:
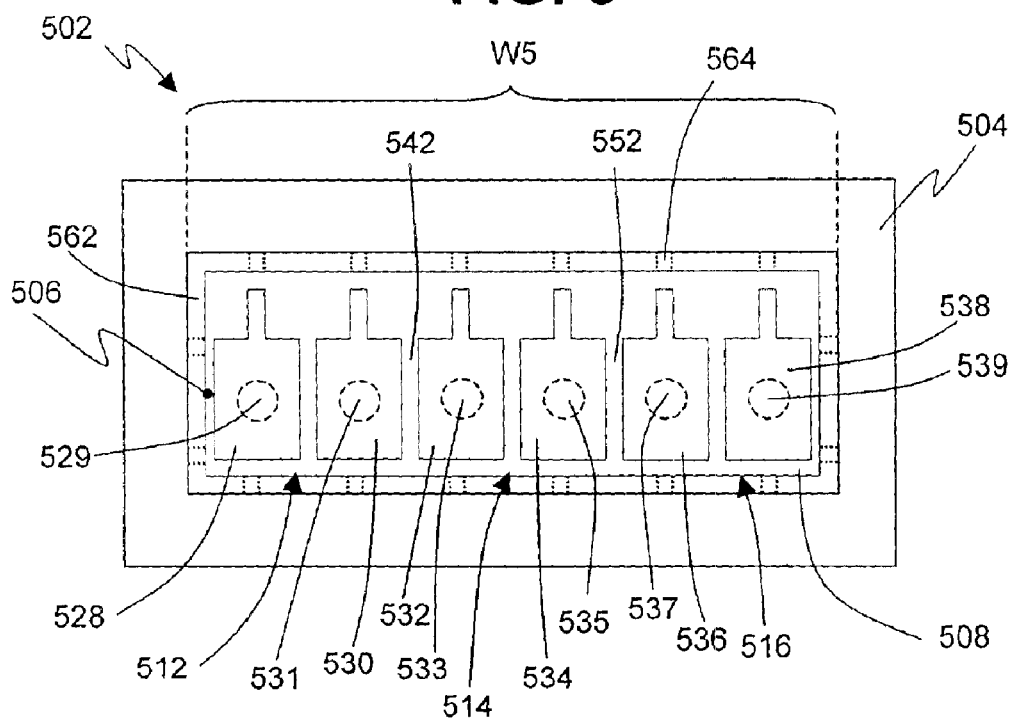
FIG. 5 illustrates in simplified form another multi-transceiver assembly of the present invention mounted in a chassis panel.

FIG. 5 illustrates a multi-transceiver assembly 502 of the present invention mounted in a chassis panel 504. Multi-transceiver assembly 502 has a width w5 and includes a multi-transceiver housing 506 in which is mounted a unibody multi-optical receptacle assembly 508. Multi-optical receptacle assembly 508 includes three optical receptacles 512, 514 and 516. Optical receptacles 512, 514 and 516 are part of multi-transceiver including three transceivers (not shown) contained in multi-transceiver housing 506. Optical receptacle 512 includes two ports 528 and 530, for example a transmit port 528 for transmitting a signal and a receive port 530 for receiving a signal, optical receptacle 514 includes two ports 532 and 534, for example a transmit port 532 for transmitting a signal and a receive port 534 for receiving a signal, and optical receptacle 516 includes two ports 536 and 538, for example a transmit port 536 for transmitting a signal and receive port 538 for receiving a signal. Each port 528, 530, 532, 534, 536 and 538 includes an optional fiber ferrule 529, 531, 533, 535, 537 and 539, respectively. Optical receptacles 512 and 514 have a unitary shared wall 542 and optical receptacles 514 and 516 have unitary shared wall 552. Multi-transceiver assembly 502 has a width w5 which spans that of multi-transceiver chassis opening 562. Optional EMI contacts 564 contact chassis panel 504 to minimize EMI leakage from the interior of the system to outside the chassis.

As can be seen in FIG. S, through the use of unitary shared optical receptacle walls, the multi-transceiver assembly of has a collective width that is considerably less than three conventional transceivers would have when mounted in a chassis panel. Because the multi-optical receptacle assembly has a unibody construction, the multi-optical receptacle assembly may be molded in one piece from plastic or cast from another suitable material. The multi-transceiver assembly may also be pluggable and utilize a cage as described in FIG. 2.

Figure 9:
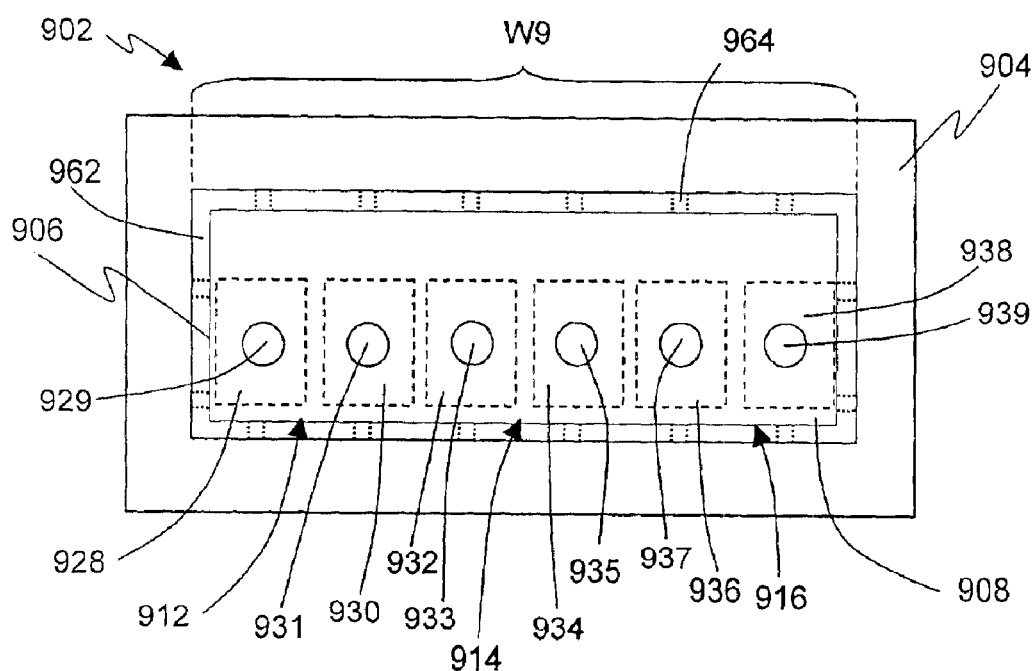
FIG. 9 illustrates in simplified form still another multi-transceiver assembly of the present invention mounted in a chassis panel.

FIG. 9 illustrates a multi-transceiver assembly 902 of the present invention mounted in a chassis panel 904. Multi-transceiver assembly 902 has a width w9 and includes a multi-transceiver housing 906 in which is mounted a unibody multi-optical receptacle assembly 908. Multi-optical receptacle assembly 908 includes three optical receptacles 912, 914 and 916. Optical receptacles 912, 914 and 916 are part of multi-transceiver including three transceivers (not shown) contained in multi-transceiver housing 906. Optical receptacle 912 includes two ports 928 and 930, for example a transmit port 928 for transmitting a signal and a receive port 930 for receiving a signal, optical receptacle 914 includes two ports 932 and 934, for example a transmit port 932 for transmitting a signal and a receive port 934 for receiving a signal, and optical receptacle 916 includes two ports 936 and 938, for example a transmit port 936 for transmitting a signal and receive port 938 for receiving a signal. Each port 928, 930, 932, 934, 936 and 938 includes a fiber ferrule 929, 931, 933, 935, 937 and 939, respectively. Optical receptacles 912 and 914 have no wall between them, and optical receptacles 914 and 916 have no wall between them. Multi-transceiver assembly 902 has a width w9 which spans that of multi-transceiver chassis opening 962. Optional EMI contacts 964 contact chassis panel 904 to minimize EMI leakage from the interior of the system to outside the chassis.

As can be seen in FIG. 9, through the use of multiple optical receptacles having no separating walls, the multi-transceiver assembly has a collective width that is considerably less than three conventional transceivers would have when mounted in a chassis panel. Because the multi-optical receptacle assembly may have a unibody construction, the multi-optical receptacle assembly may be molded in one piece from plastic or cast from another suitable material.

Figure 10:
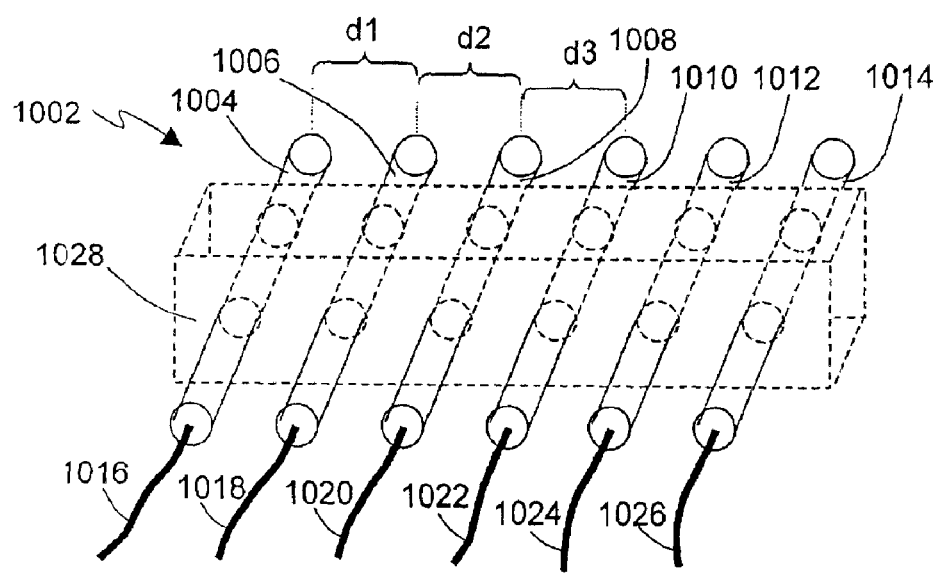
FIG. 10 is a planar view of a multi-fiber assembly of the present invention.

FIG. 10 illustrates multi-fiber assembly 1002 of the present invention having sleeves 1004, 1006, 1008, 1010, 1012, and 1014 holding fibers 1016, 1018, 1020, 1022, 1024, and 1026, respectively. Sleeves 1004, 1006, 1008, 1010, 1012, and 1014 maybe inserted, for example, into fiber ferrules 929, 931, 933, 935, 937 and 939, respectively of multi-transceiver assembly 902, or into corresponding ferrules of the other multi-transceiver assemblies described herein to couple light efficiently from the transceivers into the fibers. The fibers and sleeves may be rigidly held in optional mount 1028, or they may be loosely held in mount 1028, or they may be handled individually without the presence of mount 1028. The fibers may be part of an assembly, for example a ribbon fiber assembly, however a distinguishing feature of the invention is that they may be individual fibers which may be routed independently of each other. Another distinguishing feature of the invention over traditional multi-fiber connectors is that the spacings between fibers or sleeves does not need to be precise. For example, if d1 is the spacing between fibers 1016 and 1018, d2 is the spacing between fibers 1018 and 1020, and d3 is the spacing between fibers 1020 and 1022, then it is still allowable for d1 to differ from d2 and from d3. It is possible for d1 to differ from d2 or from d3, for example, by 5 $\mu$m, 10 $\mu$m, 25 $\mu$m, 50 $\mu$m or even more, and still be able to be inserted, for example, into the ferrules of any of the multi-transceiver assemblies described herein. If mount 1028 is not present, then one or more of the sleeves may be inserted individually into the ferrules.

Figure 6A:
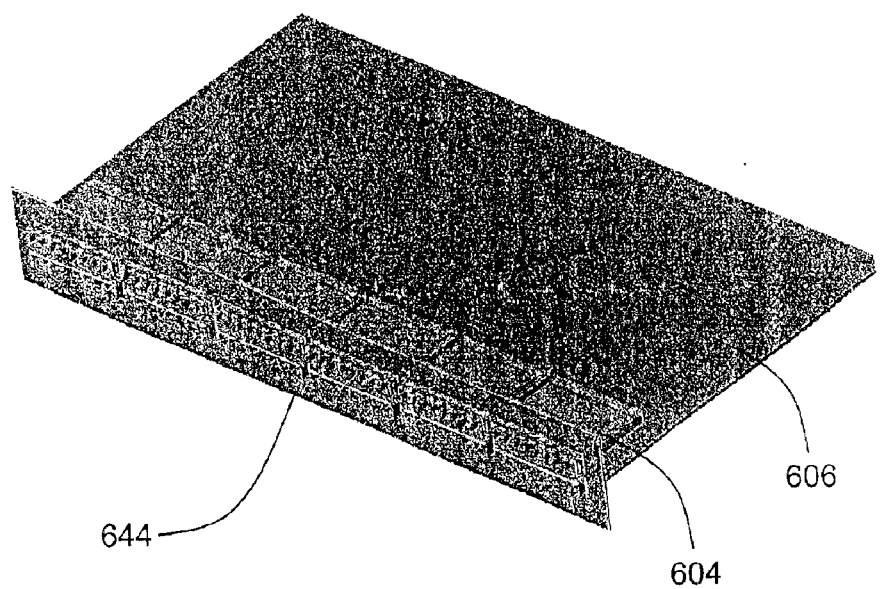
FIG. 6A depicts a preferred 48 port optoelectronic device assembly of the present invention.
Figure 6B:
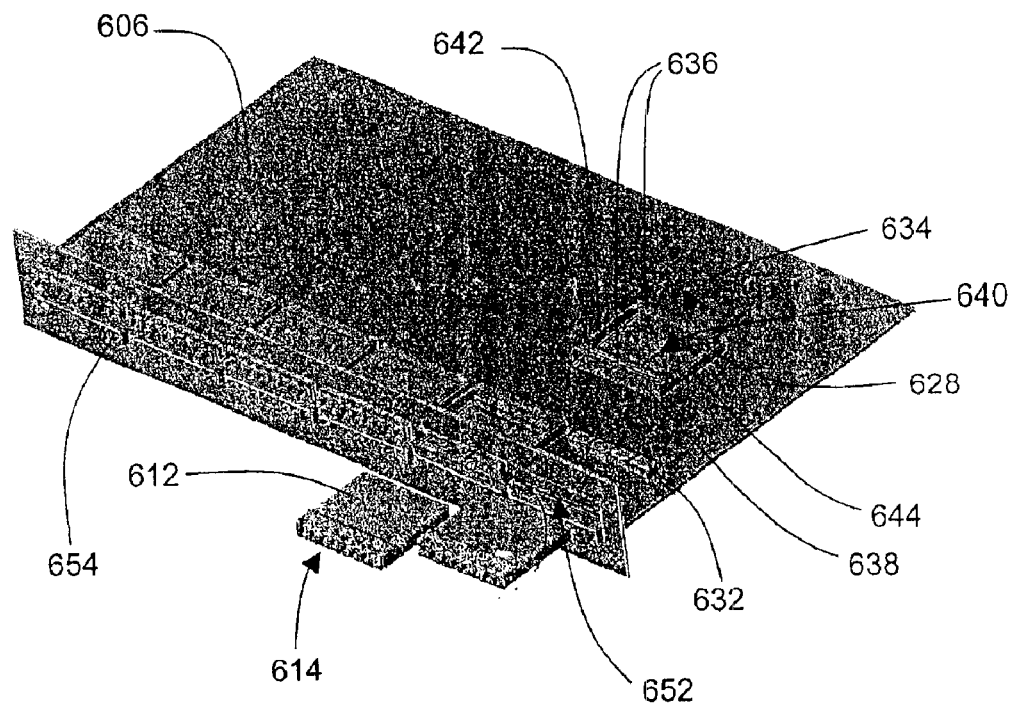
FIG. 6B depicts the 48 port optoelectronic device assembly of FIG. 6A with various parts of the assembly moved out of the way to reveal structures hidden in FIG. 6A.
Figure 6C:
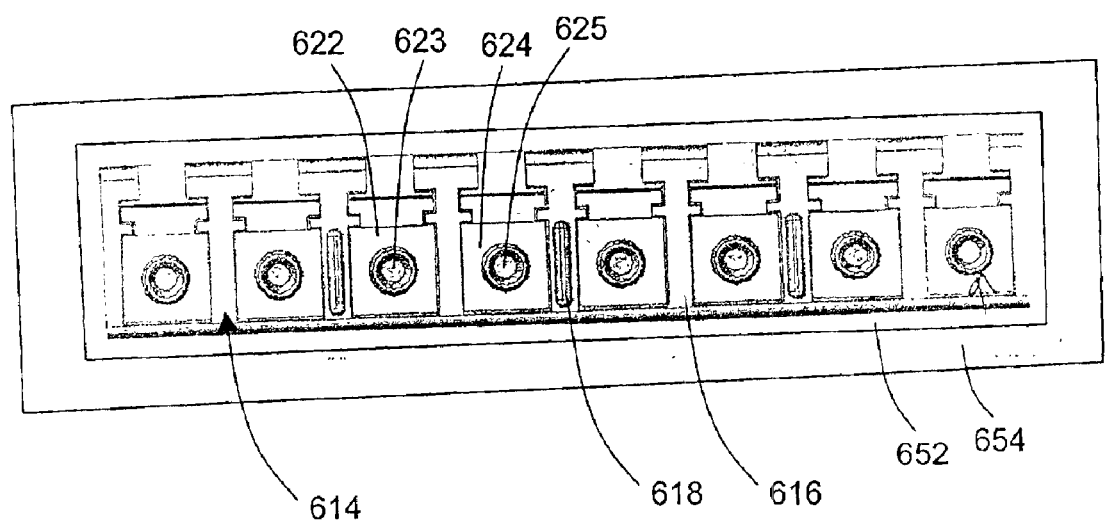
FIG. 6C is a front view of an exemplary optoelectronic device of the optoelectronic device assembly of FIG. 6A.
Figure 6D:
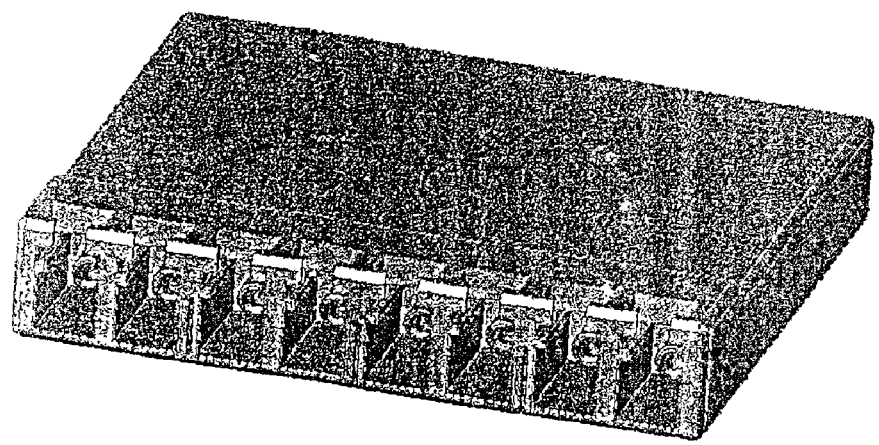
FIG. 6D is top perspective view of the optoelectronic device of FIG. 6C.
Figure 6E:
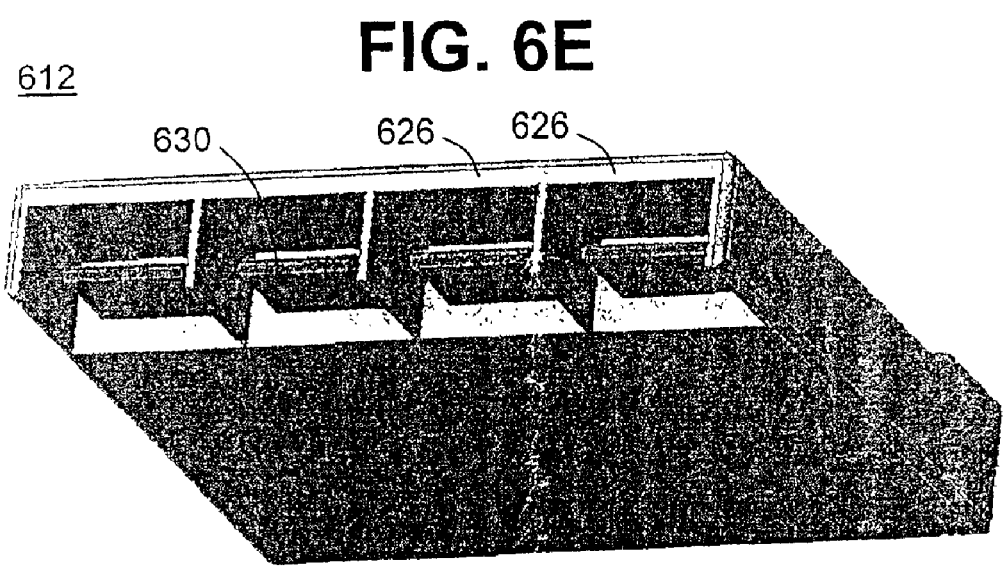
FIG. 6E is bottom perspective view of the optoelectronic device of FIG. 6C.

FIGS. 6A and 6B depict a 96-port optoelectronic device assembly 602 of a preferred embodiment of the present invention. Six optoelectronic devices 604 are mounted on one side of a PWA 606. Six additional optoelectronic devices 604 are mounted on the opposite side (not visible in FIGS. 6A and 6B) of PWA 606. Each optoelectronic device 604 includes multi-transceiver assembly 612 in which a multi-optical receptacle assembly 614 is mounted. FIGS. 6C, 6D and 6E show transceiver assembly 612 in greater detail. Each multi-optical receptacle assembly 614 includes four optical receptacles 616. Each optical receptacle 616 is separated from an adjacent optical receptacle 616 by at least one shared wall 618. Each optical receptacle 616 includes two ports 622 and 624, for example a transmit port 622 for transmitting a signal and a receive port 624 for receiving a signal. When an optical connector (not shown) is inserted into port 622, an optical fiber (not shown) of the optical connector extends into a channel 623 of port 622. When an optical connector (not shown) is inserted into port 624, an optical fiber (not shown) of the optical connector extends into a channel 625 of port 624. Each multi-transceiver assembly 614 includes four transceivers 626, each transceiver 626 being associated with a respective optical receptacle 616. Each multi-transceiver assembly 612 is mounted in a cage 628. Each of multi-transceiver assembly 612 includes four electrical contacts 630, one for each transceiver multi-transceiver assembly 614. Each of the four electrical contacts 630 in a given multi-transceiver assembly 612 make contact with a respective one of a set of four electrical connectors 632 mounted on PWA 606 through an opening 634 in the cage 628 in which multi-transceiver assembly 612 is mounted. Each cage 628 includes a top main body wall 636 and a bottom main body wall 638. Top main body wall 636 includes a large opening 640. Top main body wall 636 and bottom main body wall 638 connect side walls 642 and 644 to each other. Pins (not shown) extend from bottom main body wall through openings (not shown) in PWA 606 to allow each cage 628 to be mounted on PWA 606. Each optoelectronic device 604 extends through an opening 652 in a chassis panel 654.

Because there are 8 ports in each of the optical receptacles of the optoelectronic device assembly shown in FIGS. 6A and 6B, and there are 6 optical receptacles on each of both sides of the PWA in the optoelectronic device assembly shown in FIGS. 6A and 6B, there are 96 ports total in the optoelectronic device assembly shown in FIGS. 6A and 6B.

Figure 7A:
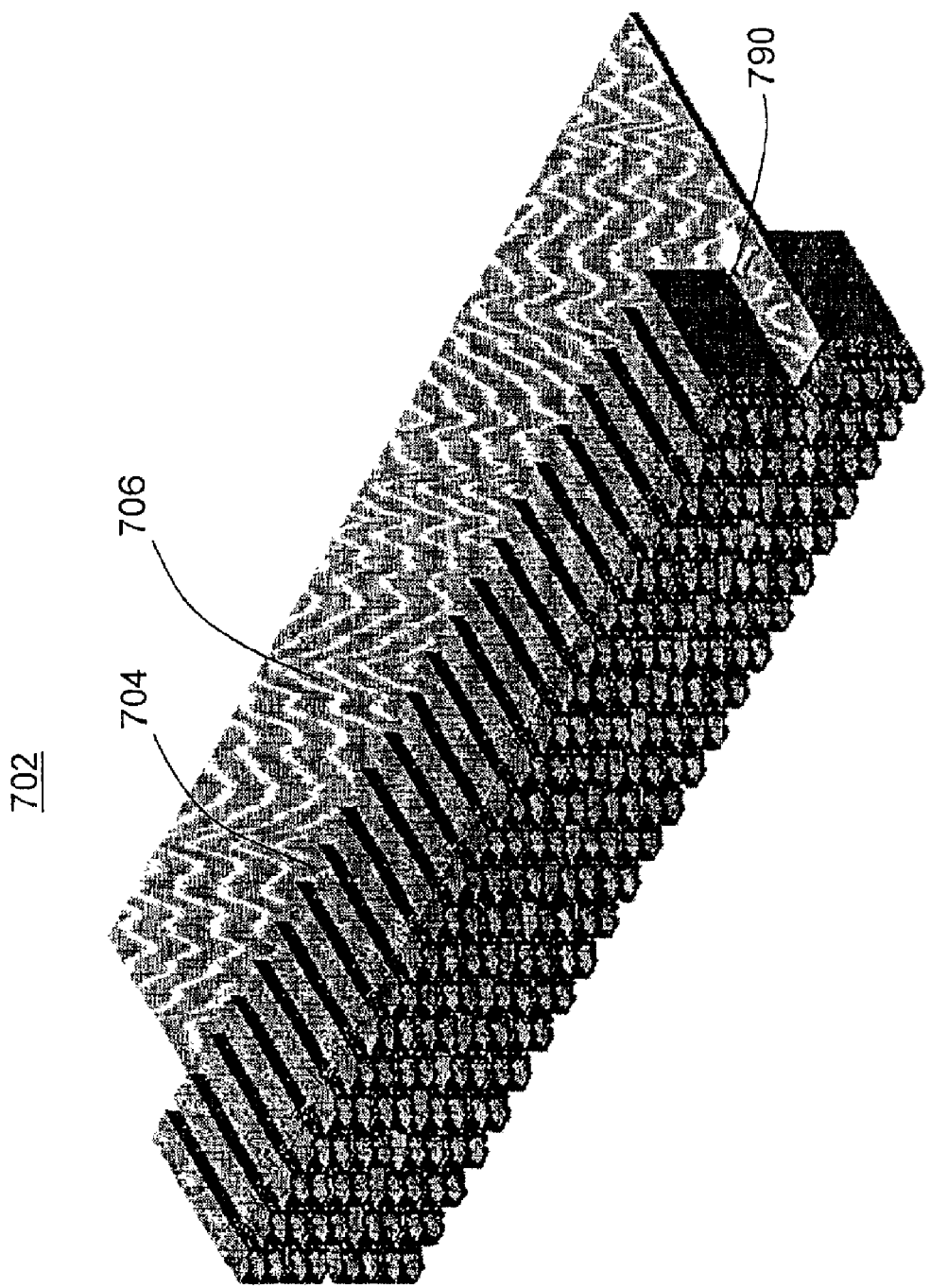
FIG. 7A is a top perspective view of an optoelectronic device assembly of the present invention with one optoelectronic device removed to show additional detail of the optoelectronic device assembly.

FIG. 7A depicts a 192-port optoelectronic device assembly 702 of a preferred embodiment of the present invention. 24 optoelectronic devices 704 are mounted on each of both sides of a PWA 706 (One optoelectronic device has been removed in FIG. 7A to show additional detail of optoelectronic device assembly 702).

Figure 7B:
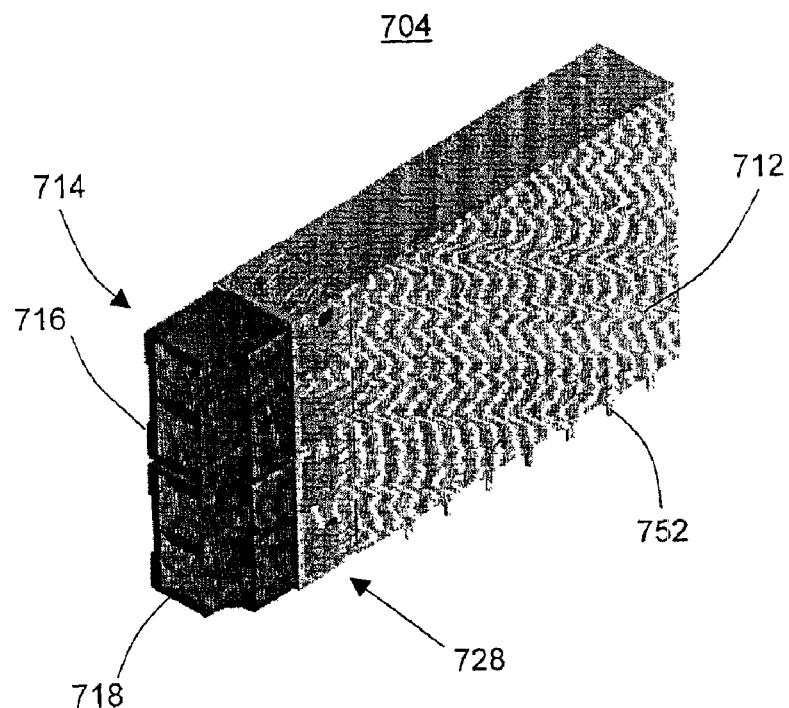
FIG. 7B is a top perspective view of an optoelectronic device used in the optoelectronic device assembly of FIG. 7A.
Figure 7C:
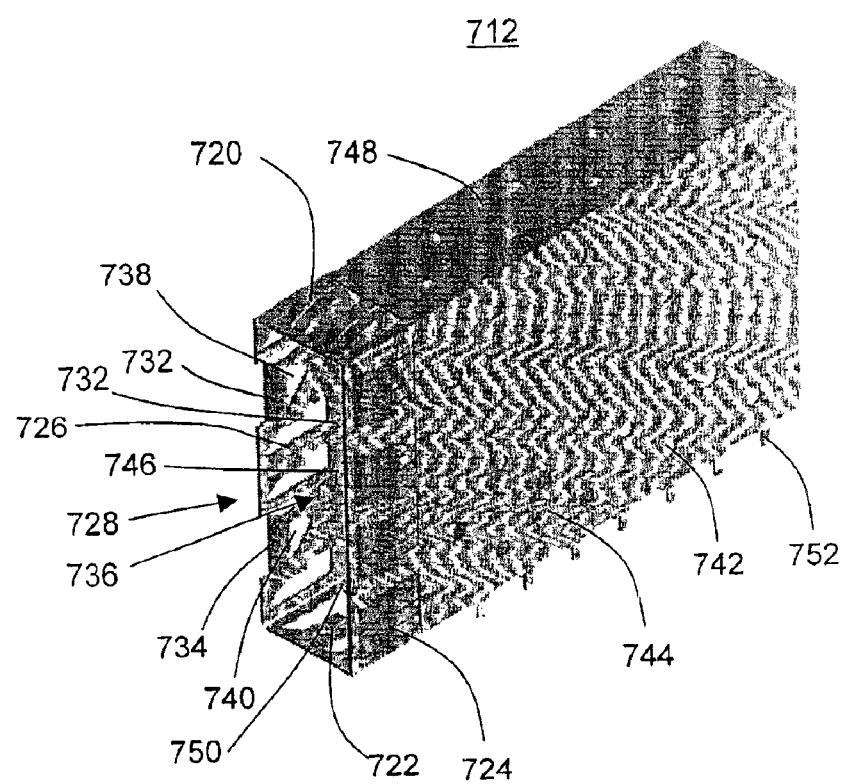
FIG. 7C is a top perspective view of a cage of an the optoelectronic device of FIG. 7B.

As shown in FIGS. 7B and 7C, each optoelectronic device 704 includes a multi-transceiver cage 712 in which is mounted a multi-optical receptacle assembly 714 including optical receptacles 716 and 718. Multi-transceiver cage 712 includes top electrical contact fingers 720, bottom electrical contact fingers 722, and two sets of side wall electrical contact fingers 724 and 726 for contacting the sides of an opening in chassis panel (not shown) through which a proximal end 728 of multi-transceiver cage extends. Multi-transceiver cage 712 includes two spring catches 732 and 734 for engaging optical receptacles 716 and 718, respectively, to thereby retain optical receptacle assembly 714 in an opening 736 in proximal end 728 of multi-transceiver cage 712. Triangular openings 738 and 740 engage triangular pins (not shown) on the bottom of optical receptacles 716 and 718 to aid in retaining optical receptacle assembly 714 in multi-transceiver cage 712. Multi-transceiver cage 712 includes circular radiation control openings 742 for controlling radiation emission from multi-transceiver cage 712. Multi-transceiver cage 712 includes two main body side walls 744 and 746 that connect top wall 748 and bottom wall 750. Multi-transceiver cage 712 also includes a closed distal wall (not shown). Bottom wall 750 includes two sets of parallel pins 752 (only one set of which is visible in FIGS. 7B and 7C) that extend through openings (not shown) in PWA 706, thereby allowing multi-transceiver cage 712 to be mounted on PWA 706 so that optical receptacles 716 and 718 are in a stacked arrangement.

Figure 7D:
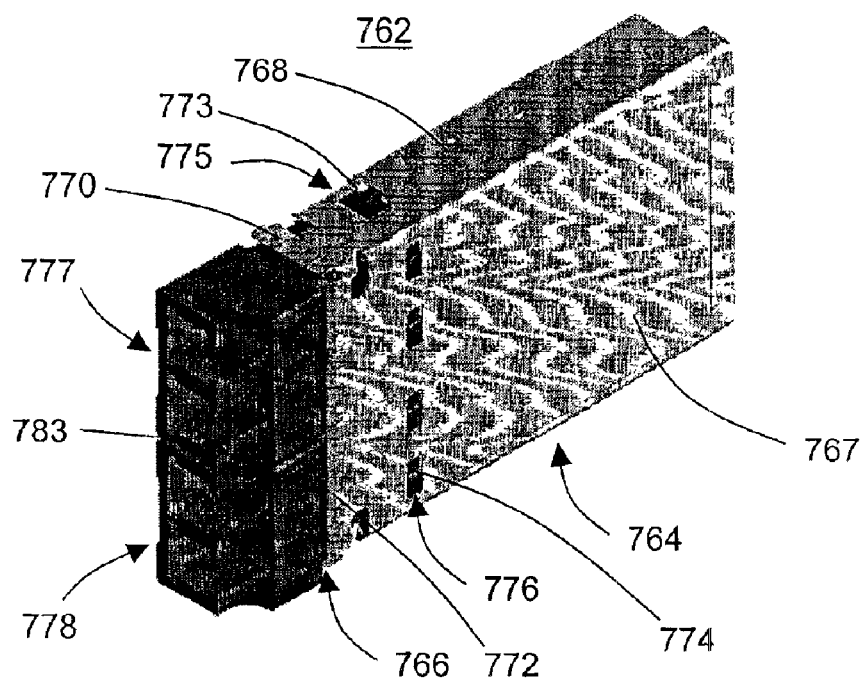
FIG. 7D is a top perspective view of a transceiver of the optoelectronic device of FIG. 7B.
Figure 7E:
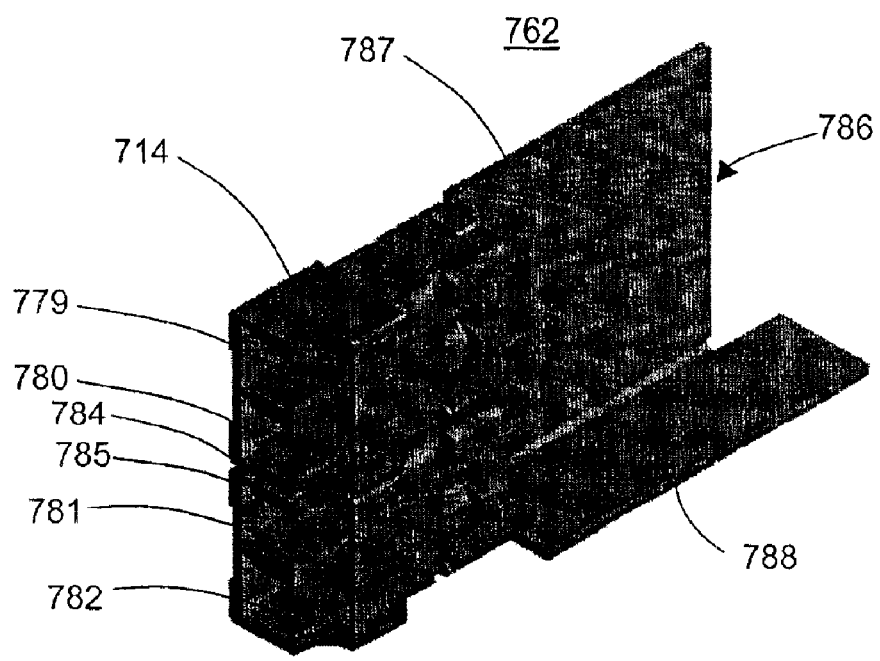
FIG. 7E is a top perspective view of a receptacle assembly of the transceiver of FIG. 7D.

FIGS. 7D and 7E show a multi-transceiver assembly 762 that is mounted in each multi-transceiver cage 712. Multi-transceiver assembly 762 includes a multi-transceiver housing 764 having an open end 766 in which is mounted multi-optical receptacle assembly 714. Multi-transceiver housing 764 includes a side main body wall 767, top wall 768, a bottom wall (not shown in FIG. 7D), another side wall (not shown in FIG. 7D) and a distal closed end (not shown in FIG. 7D). Multi-optical receptacle assembly 714 is retained in multi-transceiver housing 764 by top fingers 770, two sets of side fingers 772 (only one of which is visible in FIG. 7D) and bottom fingers (which are not visible in FIG. 7D), that resemble top fingers 770. Multi-optical receptacle 714 is also retained in multi transceiver housing 714 by the interaction of top tab 773 (only one of which is shown in FIGS. 7D and 7E) with top openings 775, and by side tab 774 of multi-optical receptacle assembly 714 (only one of which is shown in FIG. 7C) with side openings 776, and by the interactions of bottom tabs, which resemble top tab 773, on multi-optical receptacle assembly 714 and bottom openings, which resemble top openings 775, on multi-transceiver housing 764 (not shown in FIGS. 7C and 7D). Each multi-optical receptacle assembly 714 includes two paired optical receptacles 777 and 778. Optical receptacle 777 includes two ports 779 and 780, for example a transmit port 779 for transmitting a signal and a receive port 780 for receiving a signal. Optical receptacle 778 includes two ports 781 and 782, for example a transmit port 781 for transmitting a signal and a receive port 782 for receiving a signal. Each pair optical receptacles 777 and 778 has a separated two-part shared wall 783 consisting of a side wall 784 of optical receptacle 777 and a side wall 785 of optical receptacle 778. These could be shared as described in previous embodiments. Multi-optical receptacle assembly 714 also includes an L-shaped PWA 786 including a main portion 787 and a bottom portion 788 for connecting to electrical connector 790.

Optoelectronic devices 704 are electrically connected to PWA 706 by electrical contacts (not shown) in PWA 788 that connect to electrical connector 790 of PWA 706 by extending through an opening in the distal end and/or bottom side (not shown). Optoelectronic devices 704 extend through openings (not shown) in a chassis (not shown).

In the embodiment of the present invention shown in FIGS. 7A, 7B, 7C, 7D, and 7E, each optoelectronic device includes two transceivers, each having two ports, i.e. four ports per optoelectronic device. Twenty four optoelectronic devices are mounted on each of both sides of the PWA, thereby providing a total of 192 ports. Although in the embodiment of the invention shown in FIGS. 7A, 7B, 7C, 7D and 7E, the optoelectronic devices only include two transceivers each, the present invention envisions that an optoelectronic device assembly similar to the embodiment of FIGS. FIGS. 7A, 7B, 7C, 7D and 7E could include optoelectronic devices having 3, 4, or more transceivers per optoelectronic devices to provide even more ports. By using side-stacking of optical receptacles, optoelectronic device assembly arrangements of the type shown in FIGS. 7A, 7B, 7C, 7D and 713 allow a larger number of optoelectronic devices to be mounted on a PWA of given width than using a mounting method of the type show in FIGS. 6A, 6B, 6C, 6D, and 6E.

Although the optoelectronic device assembly of FIGS. 7A, 7B, 7C, 7D and 7E employs a multi-optical receptacle assembly including a two-part shared wall, an multi-optical receptacle assembly having a one piece shared wall may also be employed in an optoelectronic device assembly arrangement similar to the optoelectronic device assembly of FIGS. 7A, 7B, 7C, 7D and 7E.

Each radiation control opening of the cages shown in the embodiment of FIGS. 7A, 7B, 7C, 7D and 7E preferably has a diameter no more than 114 of the wavelength of the electromagnetic radiation corresponding to ten times the highest signal frequency present in transceiver circuitry connected to the transceiver cage. More preferably each radiation control opening of the cages shown in the embodiment of FIGS. 7A, 7B, 7C, 7D and 71E has a diameter no more than 10 of the wavelength of the electromagnetic radiation corresponding to ten times the highest signal frequency present in transceiver circuitry connected to the transceiver cage.

Figure 8:
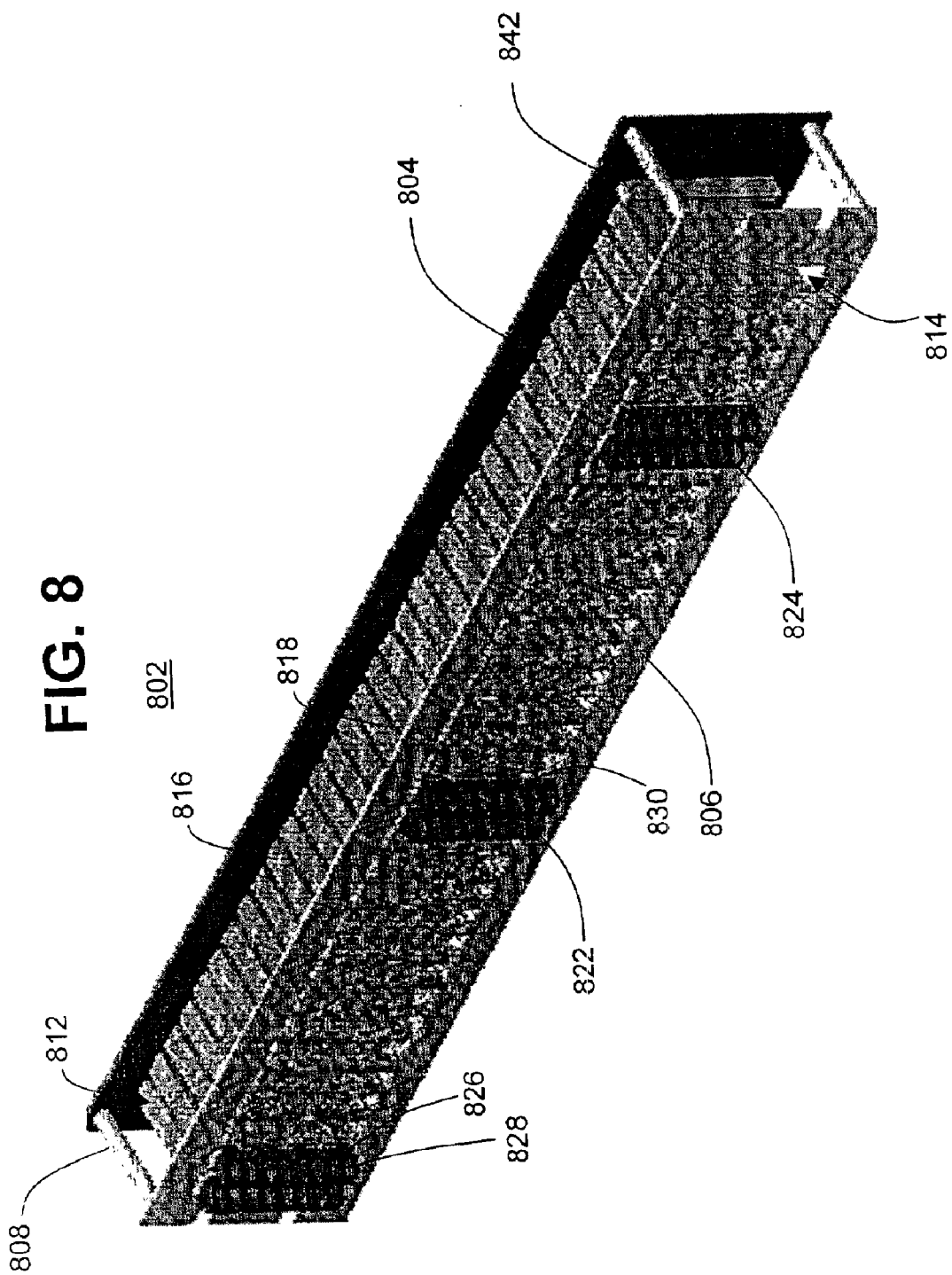
FIG. 8 is a top perspective view of an optoelectronic device assembly of the present invention with optoelectronic devices removed to show additional detail of the optoelectronic device assembly.

FIG. 8 illustrates an optoelectronic device assembly 802 of the present invention in which a PWA 804 is connected to a chassis 806 by connecting posts 808. Thirty six optoelectronic devices 812 (only 35 of the 36 optoelectronic devices are shown in FIG. 8 for convenience) are mounted on PWA 804 by mounting pins (not shown) that extend through openings (not shown) in PWA 804. Optoelectronic devices 812 extend through openings 814 in chassis 806. Each optoelectronic device 812 includes a multi-transceiver cage 816 encasing four transceivers (not shown). Each multi-transceiver cage includes radiation control openings 818. An eight port multi-optical receptacle 822 is mounted in each optoelectronic device 812 (Only 6 of the 36 multi-optical receptacles 822 are shown in FIG. 8 for convenience). Each eight port multi-optical receptacle 822 includes four optical receptacles 824 each having two ports 826 and 828, for example a transmit port 826 for transmitting a signal and a receive port 828 for receiving a signal. Adjacent optical receptacles have a shared wall 830 that is preferably unitary. Optoelectronic devices include electrical contacts (not shown) that connect to electrical connectors 842 on PWA 804.

The multi-transceiver cage of the optoelectronic devices of FIG. 8 in general resemble the multi-transceiver cage of the optoelectronic devices of FIGS. 7A, 7B, 7C, except that the pins on the multi-transceiver cage of FIG. 8 extend from a back wall instead of a side wall and the multi-transceiver cage of FIG. 8 includes an opening at a distal end of the main a main body wall that allows an electrical contact of the optoelectronic device to make contact with an electrical connector the PWA.

Although the multi-optical receptacle assembly of FIG. 8 has unitary shared walls between receptacles, an optoelectronic device assembly having the general arrangement of the optoelectronic device assembly of FIG. 8 could include a multi-optical receptacle assembly having two-part shared walls.

A preferred multi-transceiver cage of the present invention includes contact fingers at the proximal open end that are intended to make continuous electrical contact around the inner surface of a chassis panel through which the multi-transceiver cage is inserted and from which the transceiver cage protrudes. The design of the multi-transceiver cage provides a minimal open aperture between the internal contact fingers to minimize the wavelength of any electromagnetic energy available to pass through the chassis panel opening. The multi-transceiver cage of the present invention also provides a high number of contact fingers that maximize the probability and quality of electrical contact in the case of misalignment between the chassis panel and the cage and in the case of a non-optimally dimensioned chassis panel opening. For these reasons, the design of the transceiver housing of the present invention minimizes electromagnetic radiation from the chassis panel to the cage interface and provides a low resistance path between the optical receptacle and chassis panel for electrostatic discharge currents.

The multi-transceiver cage of the present invention includes mounting pins protruding from a side of the multi-transceiver cage in sufficient quantity to minimize the physical spacing so as to minimize the electromagnetic aperture and wavelength of any electromagnetic radiation that may be available to pass through. The large number of mounting pins also ensure a short return path for electromagnetic currents attempting to reach the chassis panel or signal potential in the host PWA. The mounting pins have a pin length sufficient to hold the cage rigidly in the host PWA during the soldering process and to ensure overlap of the mounting pins and the deepest grounding or signal common plane in the PWB for the shortest electromagnetic return path.

The radiation control openings in the multi-transceiver cage of the present invention are preferably circular openings in a cage for airflow and the flow of cleaning fluid into and out of the multi-transceiver transceiver housing, it should be appreciated that openings having shapes other than circular may be utilized. Whatever the shapes of the openings, preferably each of the openings has a longest dimension no greater than ¼ of the wavelength of the electromagnetic radiation corresponding to ten times the highest signal frequency present in the transceiver circuitry.

The multi-transceiver cage of the present invention may be made from several pieces of material or may be made from a continuous piece of metal to reduces the metal to metal interfaces to one, to provide a large area and continuous overlap at the interface scams and to maximize EMI performance of the cage by providing minimal impedance to electromagnetic currents flowing around the cross section of the cage.

The radiation control openings of the present invention are preferably circular openings in a cage for airflow and the flow of cleaning fluid into and out of the transceiver housing, it should be appreciated that openings having shapes other than circular may be utilized. Whatever the shapes of the openings, preferably each of the openings has a longest dimension no greater than ¼ of the wavelength of the electromagnetic radiation corresponding to ten times the highest signal frequency present in the transceiver circuitry.

The multi-transceiver housing of the present invention of the present invention may be made in a variety of ways such as stamping a single piece of material and folding the stamped piece of material to form the multi-transceiver housing. The multi-transceiver housing may also be made from die cast assemblies of parts. An advantage of making the multi-transceiver housing of the present invention from a single piece of material is Also, that the flow of electric current on the surface of the housing will tend to flow circularly around without discontinuities that would allow an electric or magnetic field to be concentrated such that an electromagnetic field could be excited externally to the housing.

In a preferred embodiment, the multi-transceiver housing of the present invention includes contacts, such as contact fingers described above, at the open end of the housing for electrical contact with the cage to restrict EMI leakage. The multi-transceiver housing of the present invention also preferably provides a minimally apparent aperture to minimize the wavelength of any electromagnetic energy available to pass through openings in the housing to receptacle to transceiver housing interface. The benefits of minimizing the apparent aperture are described in U.S. application Ser. No. 09/389,220, entitled "Enclosure for Optical Subassembly Having Mechanical Alignment Features," filed Sep. 3, 1999, the entire disclosure and contents of which are incorporated by reference. The housing of the present invention may include a relatively high number of contact fingers, preferably 5 to 10 contact fingers per side, to maximize the probability and quality of the electrical contact in the case of misalignment or tolerancing between the chassis opening, transceiver cage contact fingers and/or transceiver housing contact fingers and to minimize the apertures formed between the contact fingers. Maximizing the probability and quality of the electrical contact in this way results in minimizing the electromagnetic radiation from the transceiver and minimizing the susceptibility of the transceiver to the effects of electrostatic discharge by providing the lowest resistance path to the housing for static discharge and preventing apertures formed by a chassis/cage misalignment. In addition, the spacing between the contact fingers is preferably kept small so that the contact fingers have a contact finger spacing less than ¼ of the wavelength of the electromagnetic radiation corresponding to ten times the highest frequency of the clock frequency of the optoelectronic device of which the transceiver is a part. The clock frequency nominally corresponds to one half the baud rate of the transceiver. For a 10 Gigabaud transceiver, for example, the clock frequency would typically be 5 GHz. Ten times that frequency is 50 GHz, which corresponds to a wavelength of 6 mm in vacuum or air. For this case it therefore preferable for the contact finger spacing to be less than ¼ the wavelength, or 1.5 mm. It is even more preferable for any apertures, including openings in any cages and apertures formed by contact finger spacing, to be less than ¹⁄₁₀ of the wavelength of the electromagnetic radiation corresponding to ten times the highest signal frequency present in the transceiver circuitry. For the present example, that corresponds to a maximum aperture size of 0.6 mm.

Preferred materials for making the transceiver housing of the present invention are electrically conductive ductile metals such as steel, copper and other metals that may be easily bent to form the transceiver housing. The various contact fingers of the transceiver housing may be formed by stamping or chemically etching the contact fingers and then bending the contact fingers using known metal working techniques. Similarly, the various tabs of the transceiver housing may be formed by stamping or chemically etching the shape of the tabs, and, in some cases, bending the tabs into the appropriate positions. Alternatively, the transceiver housing may be constructed by other means such as die casting, using suitable metals such as zinc, or molded from conductive plastic, non-conductive plastics, plastic with a conductive coating, or plastic with conductive fillers.

The multi-optical receptacle assembly of the present invention may be made of either an insulating material such as plastic or a conductive material such as metal, such as, for example, steel, copper, conductive plastic, a plastic with a conductive coating, or a plastic with conductive fillers.

Although the multi-transceiver assemblies are illustrated with specific numbers of transceivers or ports, e.g. 3 transceivers or 6 ports, it should be appreciated that multi-transceiver assemblies, multi-optical receptacle assemblies, or multi-fiber assemblies of any numbers are considered part of the invention herein.

Preferably, the shared walls of the multi-transceiver assemblies of the present invention each have a thickness of 0.001 to 0.15 inch.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart there from.

What is claimed is:

1. A multi-optical receptacle assembly comprising at least two adjacent optical receptacles of a multi-transceiver assembly and a shared wall extending in a distal and/or proximal direction between said adjacent optical receptacles, wherein said optical receptacles each include at least a part of said shared wall and wherein each of said optical receptacles includes two or more channels for two or more respective optical fibers of two or more respective optical connectors to extend into when said two or more respective optical connectors are inserted into each of said optical receptacles.

2. The multi-optical receptacle assembly of claim 1, wherein said multi-optical receptacle assembly comprises two optical receptacles.

3. The multi-optical receptacle assembly of claim 1, wherein said multi-optical receptacle assembly comprises four optical receptacles.

4. The multi-optical receptacle assembly of claim 1, wherein said multi-optical receptacle assembly comprises more than four optical receptacles.

5. The multi-optical receptacle assembly of claim 1, wherein said shared wall has a thickness of 0.001 inch to 0.15 inch.

6. The multi-optical receptacle assembly of claim 5, wherein said shared wall comprises a unitary shared wall.

7. The multi-optical receptacle assembly of claim 1, wherein said shared wall comprises a unitary shared wall.

8. The multi-optical receptacle assembly of claim 1, wherein said multi-transceiver assembly comprises at least two transceivers having said shared wall between adjacent transceivers of said at least two transceivers.

9. The multi-optical receptacle assembly of claim 8, wherein said multi-transceiver assembly comprises two transceivers.

10. The multi-optical receptacle assembly of claim 8, wherein said multi-transceiver assembly comprises four transceivers.

11. The multi-optical receptacle assembly of claim 8, wherein said multi-transceiver assembly comprises more than four transceivers.

12. The multi-optical receptacle assembly of claim 8, wherein said shared wall has a thickness of 0.001 inch to 0.1 inch.

13. A multi-optical receptacle assembly comprising at least two adjacent optical receptacles and a shared wall extending in a distal and/or a proximal direction between said adjacent optical receptacles, wherein said shared wall comprises a unitary shared wall, wherein said optical receptacles each include at least a part of said shared wall and wherein each of said optical receptacles includes two or more channels for two or more respective optical fibers of two or more respective optical connectors to extend into when said two or more respective optical connectors are inserted into each of said optical receptacles.

14. A multi-optical receptacle assembly comprising:

at least two optical receptacles;

a connecting means that connects together said at least two optical receptacles; and a mounting means for mounting said multi-optical receptacle assembly in a housing, wherein said multi-optical receptacle assembly has a unibody construction and wherein each of said optical receptacles includes two or more channels for two or more respective optical fibers of two or more respective optical connectors to extend into when said two or more respective optical connectors are inserted into each of said optical receptacles.

15. The multi-optical receptacle assembly of claim 14, wherein said at least two optical receptacles comprise two optical receptacles.

16. The multi-optical receptacle assembly of claim 14, wherein said at least two optical receptacles comprise four optical receptacles.

17. The multi-optical receptacle assembly of claim 14, wherein said at least two optical receptacles comprise more than four optical receptacles.

* * * * *